United States Patent [19]

Simon et al.

[11] 3,715,960
[45] Feb. 13, 1973

[54] CAMERA MECHANISM ADAPTED TO FIRE MECHANICALLY-ACTUABLE FLASH UNITS

[75] Inventors: Horst Simon, Stuttgart; Heinrich Killgus, Kornwestheim, both of Germany

[73] Assignee: Eastman Kodak Company

[22] Filed: Nov. 27, 1970

[21] Appl. No.: 93,325

[30] Foreign Application Priority Data

Dec. 4, 1969   Germany..................P 19 60 843.6

[52] U.S. Cl. .............................................95/11.5 R
[51] Int. Cl. .............................................G03b 15/04
[58] Field of Search........................................95/11.5

[56] References Cited

UNITED STATES PATENTS

| 3,353,467 | 11/1967 | Ernisse et al. | 95/11.5 |
|---|---|---|---|
| 3,583,301 | 6/1971 | Wareham | 95/11 |
| 3,588,300 | 6/1971 | Sturm | 95/11.5 R |
| 3,576,155 | 4/1971 | Michatek | 95/11.5 R |
| 3,576,156 | 4/1971 | Beach | 95/11.5 R |
| 3,544,250 | 12/1970 | Beach | 95/11.5 R |

*Primary Examiner*—Joseph F. Peters, Jr.
*Assistant Examiner*—Michael L. Gellner
*Attorney*—Robert W. Hampton and Leonard W. Treash, Jr.

[57] ABSTRACT

A camera mechanism adapted to receive mechanically-actuable multilamp flash units has a pre-energized flash actuator bar which is released by operative movement of the shutter actuator and is propelled to extend partially from the camera body to operate a mounted flash unit. A pre-energized retracting member is subsequently released by the shutter actuator to return the flash actuator bar to its pre-energized position within the camera body. Rotation of the flash unit, to position a fresh lamp, is thus facilitated and the possibility of damaging the actuator bar is reduced.

1 Claim, 2 Drawing Figures

HORST SIMON
HEINRICH KILLGUS
INVENTORS

BY Leonard W. Suash, Jr.
RW Hampton
ATTORNEYS

CAMERA MECHANISM ADAPTED TO FIRE MECHANICALLY-ACTUABLE FLASH UNITS

CROSS-REFERENCES TO RELATED APPLICATION

Reference is made to commonly assigned U.S. Application Ser. No. 766,751 entitled "Percussion-Ignitable Flash Unit Having Contact-Actuatable, Pre-Energized Strikers and Photographic Apparatus for Using Such Units", filed in the names of Joseph V. Poweska and Jeffery R. Stoneham, now U.S. Pat. No. 3,596,581.

BACKGROUND OF THE INVENTION

1. Field of the Invention:

The present invention relates to photographic cameras and camera mechanisms useable with flash devices employing percussively-ignitable flashlamps and more particularly to mechanisms for synchronizing camera shutter operation and the actuation of such flash devices.

2. Description of the Prior Art:

It is well known in the photographic art to use electrically fired flash devices to supplement the natural light available for picture-taking. While electrically fired flash devices have provided generally satisfactory results it has proven difficult to design firing systems which are economical of manufacture and have the high reliability desirable in this application. Battery deterioration and corrosion of electrical contact surfaces work together in undermining the dependability of electrical firing systems, all to the exasperation of the camera user.

To provide for more dependable flash-photography by obviating the need for inherently troublesome electric energy sources and circuits, percussively-ignitable flashlamps have recently been developed.

Such lamps and suitable flash units for their use are disclosed in U.S. Application Ser. No. 766,751, now U.S. Pat. No. 3,596,581 in the names of Joseph V. Poweska and Jeffery R. Stoneham. More particularly this application discloses a flash unit utilizing percussively-ignitable flashlamps and pre-energized lamp strikers which are mechanically releasable along with a camera mechanism for releasing such a striker in synchronism with shutter actuation.

To adapt cameras to utilize such mechanically-actuable flash units it is necessary that the camera mechanism include some form of actuator probe to enter and actuate the flash unit. The probe must project beyond the camera body for at least a time interval sufficient to fire the flash unit. To permit rotation of the flash unit to position a fresh lamp for firing, it is necessary that the probe be withdrawn from the flash unit. Further, it is desirable to have the probe withdrawn to an unexposed position, whenever possible, to prevent its injury and the resultant loss of the flash capability of the camera. A brief interval of vulnerability to damage exists if the probe extends beyond the camera body during normal operation, as a flash unit is not present to protect the probe from abuse. A further vulnerable situation exists if the probe projects into the flash unit after firing, as the probe is subject to abuse in the event of manual rotation or removal of the flash unit. As disclosed in such Poweska and Stoneham application, a flash actuator is releasably spring energized toward engagement and release of a striker. Withdrawal of the striker from the flash unit to permit flash unit rotation is accomplished by means of a linkage coupled to the film winding assembly.

In U.S. Application Ser. No. 767,145, now U.S. Pat. No. 3,677,157, in the name of Edward L. Sturm, there is disclosed an actuating member which is withdrawn from the flash unit by return action of the camera body release, and actuating movement of the actuating member is prevented by a latch in nonflash operation. The latch is released in response to receipt of a flash unit in the apparatus.

While numerous probe retraction schemes have been devised, such as cam arrangements coupled to the flash receptacle, or the Poweska-Stoneham design discussed hereinabove, they are typically delicate of design and usually admit of some vulnerability to the probe; for example, if the body release is held down after firing in the Sturm apparatus. Accordingly, it would be desirable to have a camera mechanism which provided for synchronized flash and shutter operation and permitted the flash actuator probe to be positioned in the exposed for only the minimum interval necessary for flash firing.

SUMMARY OF THE INVENTION

Accordingly the invention provides for synchronized flash operation with rapid withdrawal of the flash actuating probe to a position within the camera body after flash firing. Disabling of the actuating probe so as to remain within the camera body during normal operation is also provided.

These desirable features are accomplished by providing a pre-energized, flash actuator, released for operation in response to shutter actuation and a pre-energized retracting member subsequently released in response to shutter actuation to return the flash actuator to a protected position within the camera body.

By utilizing direct-acting, individually-energized elements for flash firing and flash actuator retraction as opposed to multiple actuating linkages the mechanism of the invention further provides for dependable positive functioning and an inherent ruggedness of design.

Figures 1, 2:
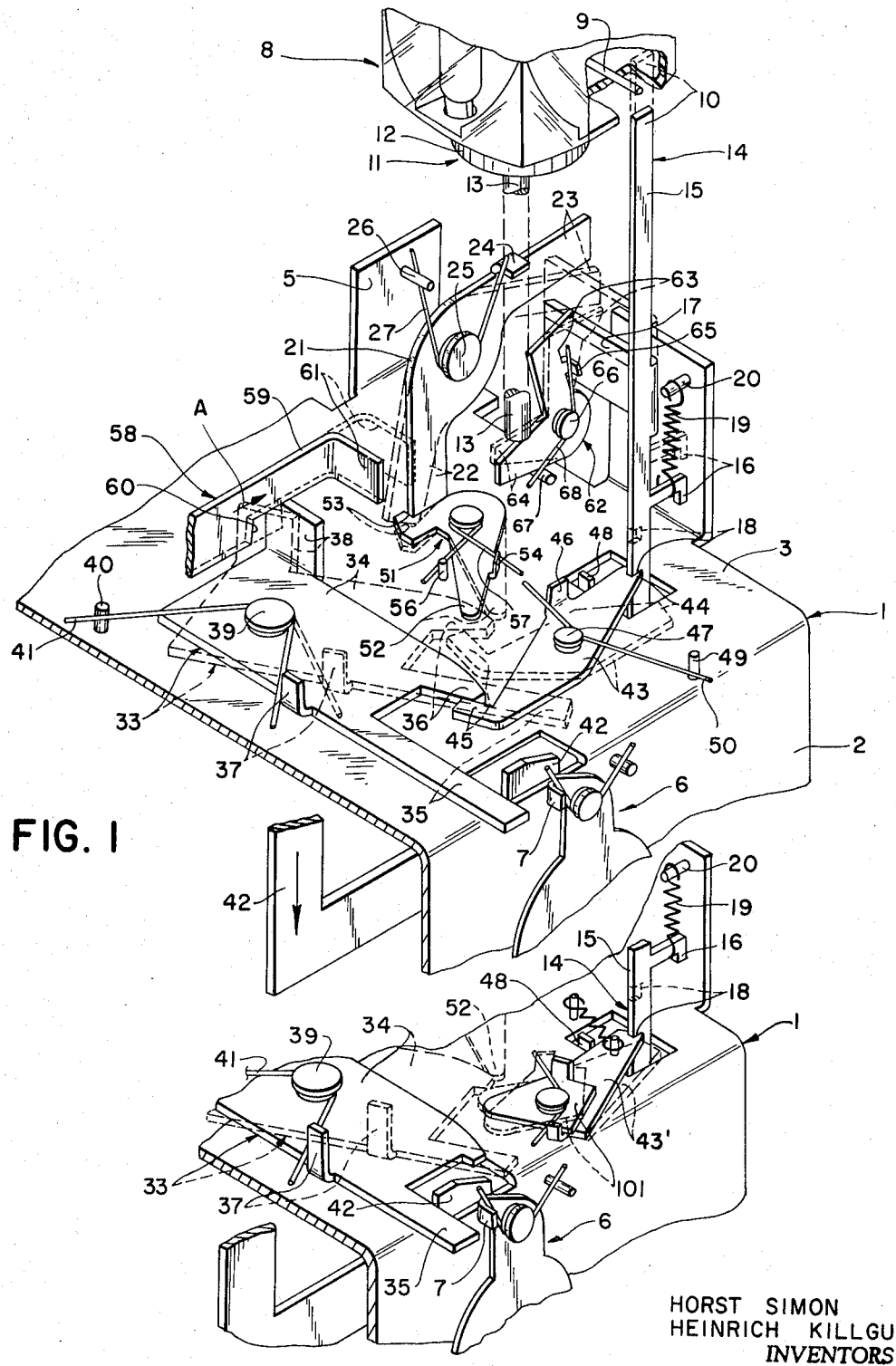
FIG. 1 is a perspective view of a camera mechanism with portions removed to better illustrate the present invention.

Solid lines are used to show the mechanism elements in their pre-operative positions for the flash mode of operation.

Dashed lines are used to illustrate alternate positions for certain of the elements where suitable to assist in the description of operation.

FIG. 2 corresponds to the front portion of FIG. 1 but illustrates an alternate embodiment of the present invention.

DESCRIPTION OF THE PREFERRED EMBODIMENTS

Because photographic cameras are well known, the present description will be directed in particular to elements forming part of, or cooperating more directly with, apparatus in accordance of the present invention. It is to be understood that camera elements not specifically shown or described may take various forms well known to those skilled in the art.

Referring to FIG. 1 a camera mechanism embodying the present invention is shown.

Structural support for mechanism elements within the camera body (not shown) is provided by a formed plate or support member 1 comprising a substantially vertical front portion 2 disposed toward the front of the camera body (not shown), a substantially horizontal portion 3 extending rearwardly of the front portion, a first spring mount 4 extending upwardly of the right side (as viewed) of the horizontal portion, and a second spring mount 5 extending upwardly of the rear edge of the horizontal portion. Support member 1 is rigidly secured within the camera body with vertical front portion 2 in front of and substantially in parallel to the film plane (not shown).

Exposure of the sensitized film is controlled by an impact-type shutter assembly 6. Such shutters are well known in the photographic art; shutter energization being provided by a striking blow to a drive arm, such as drive arm 7.

Flash unit 8 is typical of the multilamp mechanically-actuable flash units suitable for use with the present invention. Individual lamp actuators such as striker 9 are triggerable, upon being mechanically engaged, to fire their corresponding lamps (not shown). For each lamp an opening 10 is provided in flash unit 8 to permit access to the corresponding striker 9.

Capability for releasable mounting of a flash unit is provided by receiving means or receptacle 11 comprising a body portion 12 and a pin 13. Pin 13 is slidably mounted in the bottom of body portion 12 for substantially vertical movement and is disposed to be displaced on receipt of a flash unit to a lowered position. The base of the flash unit and the socket portion of the receptacle must cooperate and may be selected from various forms known in the art. Receptacle 11 is mounted to the top of the camera body for rotation to predetermined stop positions. The stop positions establish stations for the lamps of a mounted flash unit, one station being designated the firing station wherein the lamp is oriented to illuminate the scene being photographed. Each lamp may be rotated to the firing station and mechanisms for accomplishing sequential rotation are well known in the art.

Actuation of the flash unit is effected by an actuator member or bar 14 comprising a main bar portion 15, a spring arm 16, a hold-down extension 17, and a latch groove 18. Actuator bar 14 is slidably mounted to the camera body for longitudinal movement between a cocked position (illustrated by solid lines) and a projecting position (illustrated by dashed lines). The operative path of actuator bar 14 is selected to permit entry of the access opening 10 at the firing station and the projecting position of actuator bar 14 is selected to permit triggering engagement with a striker 9 at the firing station. Urging of actuator bar 14 toward the projecting position for actuating a flash unit is provided by a spring 19 which is tensioned between the spring arm 16 and a stud 20. Stud 20 is rigidly secured to spring mount 4 of support member 1.

Withdrawal of actuator bar 14 to a protected position is provided by L-shaped retracting member 21 comprising a latch arm 22 and drive-down arm 23 and a spring tab 24. Retracting member 21 is pivotally mounted to the camera body by means of a stud 25 and is disposed to permit coupling engagement between drive-down arm 23 and hold-down extension 17 of actuator bar 14. A spring stud 26 is rigidly secured to spring mount 5. A strong hairspring 27 is mounted upon stud 25 and is tensioned between spring stud 26 and spring tab 24 to urge retracting member 21 in the clockwise direction (as viewed in FIG. 1). Retracting member 21 has a latched position (shown by solid lines in FIG. 1) wherein acting as a limit on movement of actuator bar 14 beyond the projecting position and a retract position (shown by dashed lines in FIG. 1) wherein restraining the actuator bar from operative movement beyond the cocked position.

Shutter actuation is accomplished by shutter drive means such as shutter driver 33 comprising a body portion 34, a striking finger 35, a retract finger 36, and spring tab 37 and a cocking extension 38 extending upwardly of the body portion. Shutter driver 33 is pivotally mounted to support plate 1 by means of a stud 39. A spring stud 40 is rigidly secured to the support member 1. A hairspring 41 is mounted upon stud 39 and is tensioned between spring tab 37 and spring stud 40 to urge operative counterclockwise rotation (as viewed in FIG. 1) of shutter driver 33 from the cocked position (shown by solid lines in FIG. 1).

Striking finger 35 extends beyond body portion 34 to permit striking engagement with drive arm 7 in the course of an operative movement.

Release means such as release member 42 restrains shutter driver 33 from movement beyond the cocked position and releases upon sufficient depression by the camera user.

Latching of actuator bar 14 in the cocked position is provided by a first latch 43 comprising latch end 44, a driven end 45 and a spring tab 46. First latch 43 is pivotally mounted to support plate 1 by means of stud 47 and is disposed to permit latch end 44 to extend into latch groove 18 when actuator bar 14 is in the cocked position. A stop tab 48 and a spring stud 49 are rigidly secured to support plate 1. A hairspring 50 is mounted upon stud 47 and tensioned between spring stud 49 and spring tab 46 to urge latch 43 in the clockwise direction (as viewed) away from stop tab 48. Drive end 45 bends sharply to extend into the gap between striking finger 35 and retract finger 36 and thus couples movement of shutter driver 33 to latch 43. With shutter driver 33 in cocked position, latch 43 is restrained to the latch position illustrated in FIG. 1 (solid lines).

Latching of retracting member 21 in the latched position is accomplished by a second latch 51 comprising a driven arm 52, a stop catch 53 and a spring tab 54. Latch 51 is pivotally mounted to support plate 1 by means of stud 55 and is disposed to permit catch 53 to engage latch arm 22 to restrain retracting member 21 in the latched position. A spring stud 56 is rigidly secured to support plate 1. A hairspring 57 is tensioned between spring tab 54 and stud 56 to urge the second latch in the clockwise direction (as viewed) toward latching engagement with retracting member 21.

Means for cocking the mechanism is provided by a cocking member 58 comprising a body portion 59 a drive edge 60 and a bent end 61. Cocking member 58 is mounted for longitudinal sliding motion within the camera body and is disposed to permit coupling engagement between drive edge 60 and cocking extension 38 of shutter driver 33.

Bent end 61 extends to permit coupling engagement with latch arm 22 of retracting member 21. Movement of cocking member 58 in direction A to the set position (illustrated by dashed lines in FIG. 1) moves retracting member 21 to the latched position this being accomplished by displacing the sloped edge of stop catch 53. Shutter driver 33 is moved to the cocked position by engagement with drive edge 60, this being accomplished by forcing striking finger 45 past a sloped edge of release member 42. Movement of shutter driver 33 to the cocked position is imparted to first latch 43 by retract finger 36 forcing the first latch to the latch position.

Disabling of actuator member 14 during normal operation is accomplished by disabling means such as disabling latch 62 comprising a latch arm 63 a driven arm 64 and a spring tab 65. Disabling latch 62 is pivotally mounted to the camera body by means of a stud 66 and is disposed to permit coupling engagement between driven arm 64 and pin 13. With the pin 13 in the lowered position, disabling lever 62 is correspondingly displaced to a release position wherein latch arm 63 is withdrawn from actuator bar 14. A spring stud 67 is rigidly secured to the camera body. A hairspring 68 is mounted on stud 66 and is tensioned between spring tab 65 and spring stud 67 to urge disabling latch 62 to a latch position wherein latch arm 63 engages hold-down extension 17 preventing movement of actuator bar 14 from the cocked position.

Intended operation of the preferred embodiment is initiated upon depression of release member 42 by the camera user. Sufficient depression releases shutter driver 33 which moves operatively to engage and actuate shutter assembly 6. Operative motion of shutter driver 33 permits clockwise rotation (as viewed in FIG. 1) of first latch 43 thereby unlatching actuator bar 14.

If no flash unit is mounted (normal operation), disabling latch 62 restrains actuator bar 14 to remain protected within the camera in the cocked position. Shutter driver 33 continues moving to engage second latch 51 to release retracting member 21. Retracting member 21 upon release moves to the retract position under the urging of spring 27.

With a flash unit mounted pin 13 is displaced to the lowered position forcing disabling latch 62 to withdraw from actuator bar 14 and move to the release position. Operation is initiated by depression of release member 42 to release shutter driver 33 for operative motion. Shutter driver 33 strikes and energizes shutter assembly 6 for an exposure oscillation. Operative movement of shutter driver 33 permits coupled first latch 43 to move from the latch position releasing actuator bar 14. Actuator bar 14 than moves under urging of spring 19 to the projecting position thereby triggering the flash unit. The travel time for shutter driver 33 to move to engage and release second latch 51 provides a delay allowing firing of the flash unit. Release of second latch 51 permits retracting member 21 to move to the retract position under the urging of strong hair spring 27. Strong hairspring 27 overpowers spring 19 and actuator bar 14 is driven to the cocked position wherein the actuator bar is removed from the opening 10 and protected by the camera body. Cocking of the mechanism is accomplished by pushing cocking member 58 in direction A, as described hereinabove.

ALTERNATE EMBODIMENT:

An alternate embodiment of the present invention is illustrated in FIG. 2. The only significant change is to first latch 43. First latch 43' is assembled in two pieces and comprises a first portion 100 disposed to permit entry of latch groove 18 and a second portion 101 extending into the operative path of shutter driver 33. Portions 100 and 101 are assembled to cooperate as a spring hinge to permit first portion 100 to be forced from latch groove 18 when second portion 101 is operatively engaged by shutter driver 33. The hinge action permits return of shutter driver 33 to the cocked position during a cocking operation. The overall operation of the remaining portions of the alternate mechanism is substantially the same as for the presently preferred embodiment.

The invention has been described in detail with particular reference to a preferred embodiment thereof, but it will be understood that variations and modifications can be effected within the spirit and scope of the invention.

We Claim:

1. In a photographic camera of the type having a shutter, a shutter driver mounted in said camera for movement along a shutter operating path, means for moving said shutter driver along said path in response to a picture taking actuation of said camera and means for releasably receiving and sequentially positioning at a camera firing station a flash unit of the type having a plurality of flash devices with releasable preenergized strikers and a base with an access opening for each striker, an improved flash actuating mechanism comprising:
   1. a flash actuator member mounted in said camera for movement between an extended position for releasing engagement with the striker of a received flash unit positioned at the firing station and a cocked position withdrawn from said extended position to facilitate repositioning of such flash unit;
   2. means for urging said actuator member from the cocked position to the extended position;
   3. means for latching said actuator member in the cocked position and for releasing said actuator member in response to movement of said shutter driver past a first location on said operative path;
   4. retracting means, mounted in said camera for operative association with said actuator member, for urging said actuator toward said cocked position;
   5. means for releasably retaining said retracting means out of urging relation with said actuator; and
   6. means, mounted in said camera for operative association with said retaining means and said shutter driver, for releasing said retracting means in response to movement of said shutter driver past a second location on said operative path.

* * * * *